May 12, 1970     F. G. BOGGIO ET AL     3,511,075

METALWORKING METHOD OF SECURING A SLEEVE TO A CORE

Filed Oct. 11, 1966     4 Sheets-Sheet 1

INVENTORS
NATHAN M. KRAMAROW &
F. GEORGE BOGGIO
BY Brumbaugh, Free,
Graves & Donohue
their ATTORNEYS

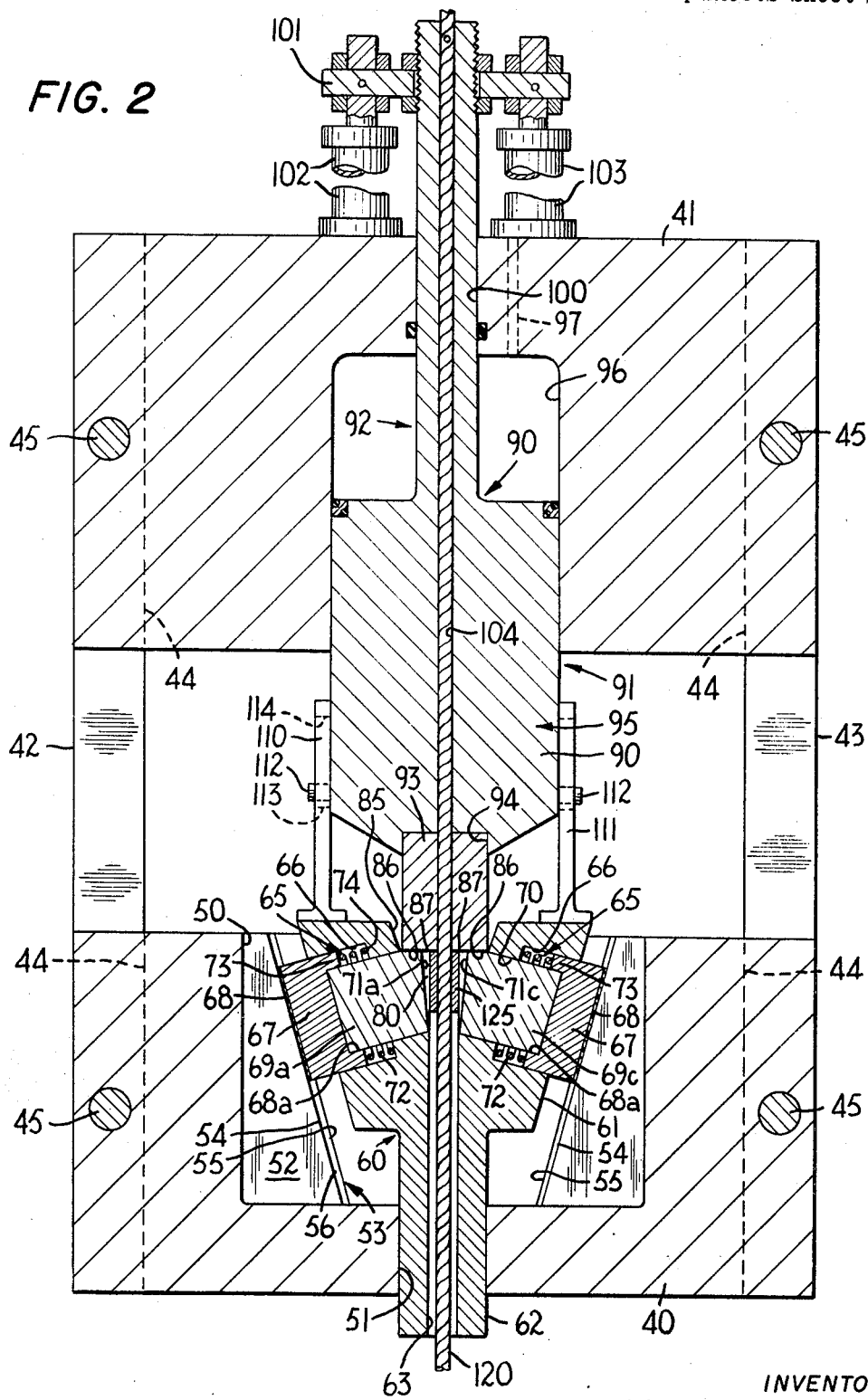

INVENTORS
NATHAN M. KRAMAROW &
F. GEORGE BOGGIO
BY
their ATTORNEYS

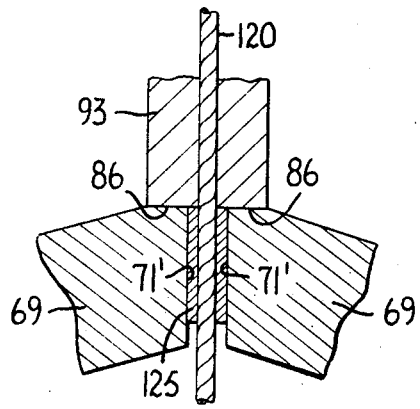
FIG. 11
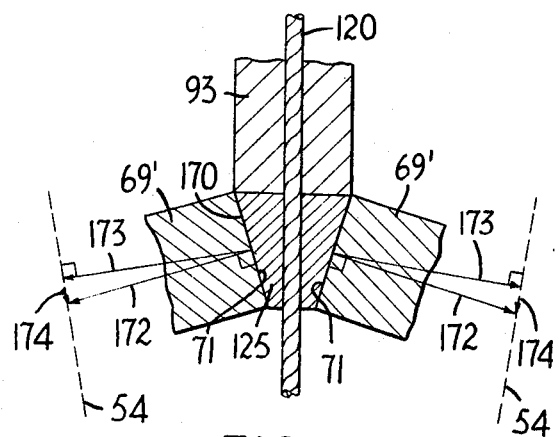
FIG. 12
FIG. 13
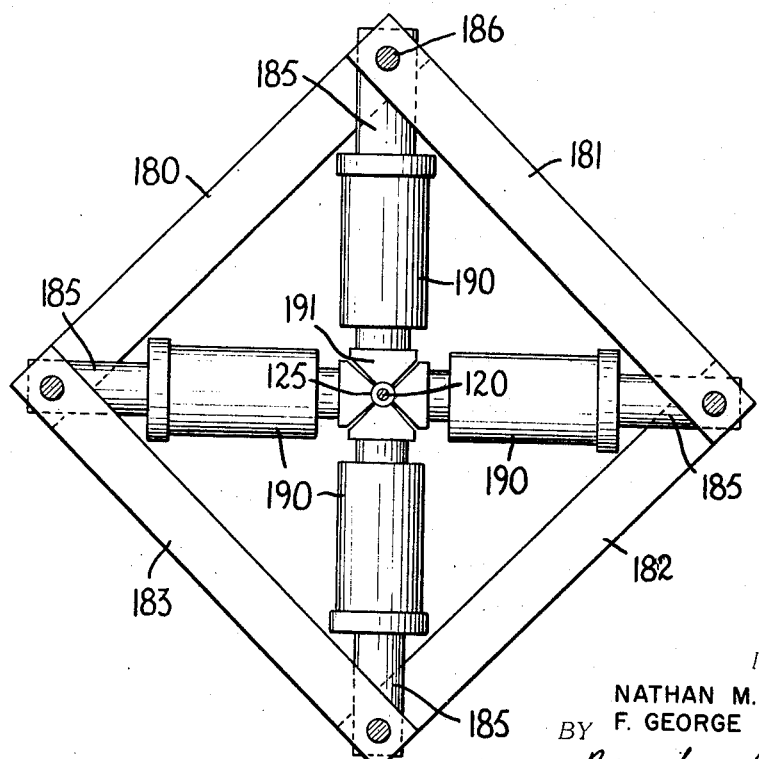

ated May 12, 1970

3,511,075
METALWORKING METHOD OF SECURING A SLEEVE TO A CORE
F. George Boggio, Glen Rock, N.J., and Nathan M. Kramarow, Flushing, N.Y., assignors to Barogenics, Inc., a corporation of New York
Filed Oct. 11, 1966, Ser. No. 585,806
Int. Cl. B21j 7/14
U.S. Cl. 72—402         13 Claims

ABSTRACT OF THE DISCLOSURE

Apparatus particularly suited for securing sleeves to a core and comprising a hydraulic cylinder in which is mounted a movable piston. The piston has a forward ram section and coaxial rearward stem section of smaller diameter than the ram section. The ram section has a front end separate from the cylinder and a back end slidably received in the cylinder. The stem section extends rearwardly from the ram section through an aperture formed in the back end of the cylinder and beyond the back end to the outside of the cylinder. The piston has an axial bore formed therein which extends through the ram section and the stem section to provide an axial passage completely through the piston. Seal means are disposed around the stem section to seal the passage of the stem section through the aperture and prevent leakage of hydraulic fluid from the interior of the cylinder to the outside thereof.

---

This invention relates generally to methods and apparatuses for securing a circumferentially closed metal sleeve on central metal core means. More particularly, this invention relates to methods and means of such sort wherein the securement of the sleeve to the core means is effected by circumferentially pressurizing the sleeve by radially inward directed pressure which plastically deforms the sleeve metal so as to produce a gripping of the core means by the sleeve.

The invention is of application irrespective of whether the core means has a smooth or an irregular exterior and irrespective of whether the cross section of the core means is solid throughout or contains one or more void spaces. Thus, methods and apparatuses according to the invention may be used to securely fasten a sleeve to a solid rod or bar (such as a post-tensioned bar used for pre-stressing concrete) whose exterior surface is either smooth or is made irregular by the presence thereon of, say, axially alternating circumferential ridges and valleys. Alternatively, those methods and apparatuses may be used to securely fasten a sleeve onto a metal tube of smooth or irregular exterior. The invention, however, is of particular utility for securing a circumferentially closed metal sleeve on metal core means in the form of a single multistrand cable or a bundle of such cables.

For a better understanding of the invention, reference is made to the following description and to the accompanying drawings wherein:

FIG. 2 is a view in cross-section of an exemplary embodiment of apparatus according to the invention for securing sleeves to the cable of, say, FIG. 1;

FIGS. 11 and 12 are modifications of the anvil structure of the FIG. 2 press; and FIG. 13 is a schematic diagram of a press which may be used instead of the FIG. 2 press in carrying out sleeve securing methods according to the invention.

Figure 1:
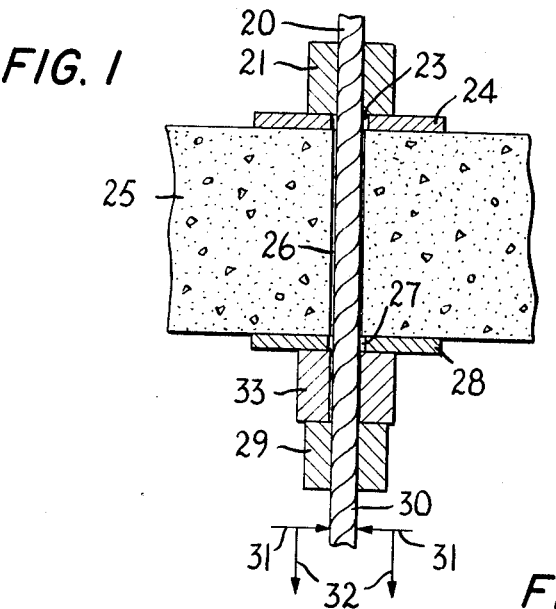
FIG. 1 is a schematic diagram of a multistrand cable and anchor sleeves as used to post-tension concrete.

Referring to FIG. 1 it has been proposed to post-tension concrete by cabling in a manner as follows. A length of multistrand metal cable 20 has a metal anchor sleeve 21 secured to one end thereof. The cable 20 extends from sleeve 21 through a hole 23 in a metal bearing plate 24 on one side of a concrete mass 25 intended to be stressed in compression. From plate 24, cable 20 passes through a hole 26 in concrete 25 to the opposite side thereof and then through a hole 27 in a metal plate 28 which bears against such concrete on that opposite side. An anchor sleeve 29 is secured outward of plate 28 on a section of the cable which passes through the sleeve 29 to provide a free end 30 outward of that sleeve.

The cable 20 is post-tensioned in a manner as follows. The free end 30 of the cable is gripped (as represented by arrows 31) by jaws or other gripping devices forming parts of a conventional post-tensioning hydraulic jack (not shown). The jack exerts on the cable a tension force represented by the arrows 32 and not exceeding the elastic limit of the cable. Because sleeve 21 is larger in diameter than the hole 23 in bearing plate 24, the upper end of the cable is anchored (relative to concrete mass 25) against movement in response to that tension force. Hence, the tension in the cable is converted into a downward compressive force exerted by sleeve 21 through bearing plate 24 on the concrete mass 25.

Below sleeve 21, the cable 20 is stretched by the tension to produce a slight increase in the distance between bearing plate 28 and sleeve 29. Thereupon, spacer elements 33 (which may be the two halves of a split sleeve) are inserted outward of plate 28 so as to fit tightly between the plate and sleeve 29.

The tension force from the jack is then released so that the length of cable between sleeves 21 and 29 tends to contract to its original length. Because, however, of the insertion of the spacer elements 33, the cable is unable to contract more than slightly and, accordingly, is maintained in a post-tensioned condition wherein the substantial tension still in the cable is converted into an upward compressive force exerted by achor sleeve 29 through spacer elements 33 and bearing plate 28 on concrete mass 25. Thus, the effect of the post-tensioning of cable 20 is to stress the concrete mass 25 in compression.

In practice, of course, the distance between the opposite sides of the stressed concrete mass would ordinarily be greater than that suggested by FIG. 1.

Because multistrand cable is flexible and, hence, can be readily stored and transported and, also, can be given curved or bent configurations within a concrete mass and, because, moreover, appropriate lengths of cable can be readily cut from a coil or reel thereof, the ability to use post-tensioned multistrand cable as a means for prestressing concrete would provide a number of advantages absent from the conventional present day practice of prestressing concrete by post-tensioned rods or bars. In the past, however, efforts to use cable as a post-tensioned concrete stressing means have not met with full success because of difficulties encountered in securing anchor sleeves to the cable. Specifically, the strands of the cable are metal wires which have been drawn many times so as to have exteriors which are very hard and smooth. Thus, the strands offer poor surfaces by which to obtain a secure fastening of an anchor sleeve to the cable by friction alone. Also, if the sleeve has a circular interior surface, that surface can engage the cable only by making line contacts with the outside strands of the cable rather than (as would be preferable) making areal contact with all or most of the circumferential periphery of the cable.

A further difficulty arises out of the fact that the cable has void spaces between its strands (i.e., is not of wholly solid cross-section) and thus is or tends to be capable of further compaction in its cross-sectional area. Accordingly, if it is attempted to fasten a sleeve on the cable by, say, shink fitting, the strands of the cable may respond to the gripping action of the shrink-fitted sleeve either by bodily shifting relative to each other to form a more compact configuration of strands or by resiliently deforming so as to be radially compressed but expanded transversely into the voids between the strands so as, in either case, to prevent a tight frictional engagement between the sleeve and the cable.

Still further, if the gripping action of the sleeve on the cable is made very great in an attempt to provide a tighter frictional engagement, the strands of the cable may be deformed beyond their elastic limit so as to lose much of their tensile strength. Likewise, the cable strands may lose much of their tensile strength if it is attempted to securet the sleeve on the cable by hot-working methods.

In an attempt to find a practical mode of securing an anchor sleeve to a multistrand cable it has been proposed to use an upsetting technique wherein the metal of the core is plastically deformed by great pressure applied to the axially opposite ends of the sleeve. This upsetting method has, however, not worked out well in practice because it does not produce an intimate enough engagement between the sleeve metal and the exterior of the cable and because the strands of the cable tend to be stretched beyond their elastic limit so as to be weakened in tensile strength.

It is accordingly an object of this invention to effect securement of a metal sleeve to a multistrand or other central core means by methods which avoid the above mentioned disadvantages.

Another object of this invention is to provide apparatus which is adapted to carry out methods of such sort nad which also may be adapted for other useful applications.

Still another object of this invention is to provide an article of manufacture which is an aspect of the present invention, and which is in the form of a circumferentially closed metal sleeve securely fastened onto a metal core comprised of a single multistrand cable or a plurality of such cables.

These and other objects are realized according to the invention in a manner which, briefly, is as follows. The core means is first passed (in a relative sense) through the sleeve so as to be surrounded by the sleeve. That is, either the core means may be threaded into and through the hollow interior of the sleeve or the sleeve may be slipped over the core means.

The sleeve is then circumferentially pressurized by radially directed inward pressure which plastically deforms the sleeme metal to squeeze it radially against the core means and to produce a slip-free engagement between the sleeve and core means when the pressure is thereafter released. In instances where the exterior surface of the core means is irregular so as to have prominences with void spaces therebetween, protrusions of the plastically deformed sleeve metal are squeezed into those void spaces so as to increase the area over which the sleeve grips the outside of the core means.

Preferably, the metal of the core means has a higher elastic limit than that of the sleeve, and the pressurizing of the sleeve is conducted in a manner which plastically deforms the sleeve metal while avoiding straining the metal of the core means beyond its range of resilient deformation. Further, the plastic deformation of the sleeve is preferably accomplished by coldworking techniques under conditions appropriate to create a contractive autofrettage effect so that, when the pressure on the sleeve is released, a radially outward part of the sleeve is in hoop tension, and a radially inward part of the sleeve is in hoop compression and tightly grips the core means therewithin. Still further, to increase the gripping effect of the sleeve on the core means, it is preferable that the sleeve engage the core means over an axial extent greater than the inner diameter of the sleeve.

The pressure for plastically deforming the sleeve may be provided by different forms of apparatus. Thus, as will be described, such pressure may be provided either by apparatus of which the FIG. 2 device is exemplary and which creates the pressure by a wedging action or, alternatively by apparatus of which the FIG. 13 device is exemplary, and which utilizes a plurality of hydraulic rams to directly generate the radial pressure. It is to be noted that the forms of apparatus to be described herein have applications other than that of securing a metal sleeve to a central metal core means.

In the instance where the core means is of multistrand character, the result of the practice of methods according to the invention and carried out by apparatus according to the invention is an article of manufacture comprised of a circumferentially closed metal sleeve fastened in a slip-free manner to a central multistrand metal core.

For a better understanding of the various aspects of the invention, reference is made to the following descriptions of specific embodiments thereof.

FIG. 2 PRESS

In the FIG. 2 press, the reference numerals 40 and 41 designate solid metal lower and upper axially spaced crossheads. Extending between the cross heads are lefthand and right-hand side-to-side arrays 42 and 43 of parallel tie bars. The tie bars in each array are spaced from each other in a direction normal to the plane of the drawing and are received at their lower and upper ends in slots 44 formed in the sides of, respectively, the lower crosshead 40 and the upper crosshead 41. Each array of the bars is coupled at its lower and upper ends to the crossheads at those ends by pins 45 passing through the crossheads and the tie bars. The crossheads and the two sets of tie bars thus form a press frame which is somewhat similar to that disclosed in French Pat. 1,401,193 but which has solid crossheads as in U.S. Pat. 2,968,837.

The lower crosshead 40 has formed therein a large cylindrical chamber 50 which is open at the top and from the bottom of which a smaller-diameter coaxial cylindricall aperture 51 passes downwardly through the crosshead. The chamber 50 forms a receptacle for a tubular container or sleeve 52 of which the interior circumferential wall 53 is shaped to have a generally concial taper so that opposite sides of the wall converge towards each in the direction from the upper open end of the container to the smaller lower open end thereof. Formed on wall 53 are four equiangularly spaced planar slide surfaces 54 of which each extends downwardly between two raised parallel metal ridges 55 which may be formed either by machining of the interior of container 52 or by metal strips which are screwed or otherwise secured to that ininterior. Each slide surface and its associated ridges thus form a downwardly extending inwardly slanting guideway 56 of which the slide surface provides the bottom and the ridges provide the sides.

Received in contained 52 is a tubular guide fixture having a coaxially tapered exterior 61 spaced from the interior wall 53 of the container 52. The lower part of fixture 60 is shaped as a stem 62 received in aperture 51 with a sliding fit to maintain the fixture in coaxial relation with the container. The interior of the fixture is in the form of an axial bore 63 providing a vertical passage all the way through the fixture.

The fixture 60 has formed therein four equiangularly spaced apertures 65 of which each registers with a respective one of the planar slide surfaces on the wall 53 of the container, and of which each passes radially through the container from the exterior thereof to the interior thereof at an angle which is normal (or substantially so) to the line of the corresponding slide surface. Each aperture 65 has a diametrally enlarged rearward portion 66 in which is slidingly received a back-up plate or shoe 67 having a planar rear surface which bears either directly on the corresponding slide surface or through a "Teflon" lubricant sheet 68. Seated in a shallow socket-type recess formed in the front of each plate 67 is an anvil which is generally designated as 69 and which passes with a sliding fit through a forward reduced-dimension portion 70 of the corresponding aperture 65 so that the front face 71 of the anvil is disposed at the side of or within the central axial bore 63 of the fixture 60. The anvils 69 are constituted of a hard strong material such as cemented tungsten carbide or Stellite. Each anvil is secured by a shrink fit( or in some other suitable manner) to its corresponding back-up plate 67.

The press structure as so far described is similar in certain respects to structures disclosed in U.S. Pat. 3,105,-994 and Canadian Pat. 719,639.

Each anvil 69 is encircled by a helical compression spring 72 which is disposed in the enlarged aperture portion 66 between the annular front end 73 of the back-up plate for that anvil and a shoulder 74 formed in the aperture 65 by the junction of the diametrally enlarged and reduced aperture portions 66 and 70. As later described in more detail, each of springs 72 is adapted to act as an anvil retractor by pushing both against the shoulder 74 in the associated aperture and the back-up plate 67 in that aperture so as to urge the plate (and, therefore, the anvil secured thereto) in the radially outward direction.

Figure 4:
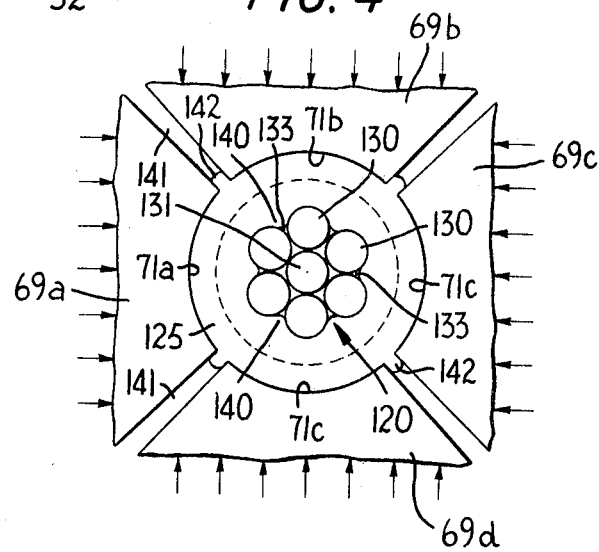

To distinguish the four anvils 69 from each other, they are individually designated as 69a, 69b, 69c, 69d and their front faces are correspondingly designated as 71a, 71b, 71c, 71d (see, e.g., FIG. 4).

The four anvils are spaced about the bore 63 of fixture so as to form a ring around a central pressurizing space 80 in a manner whereby, when the anvils project inwardly beyond the apertures in which they are contained, the forward anvil portions are separated from each other by radially extending gaps permitting simultaneous radial inward movement of all four anvils. The mentioned space 80 is open at both of its axially opposite ends and is circumferentially bounded by the front faces of the anvils except where the anvils are separated by the mentioned gaps. In the FIG. 1 press, the anvil front faces have, as shown, a slight inward slant in the downward direction, wherefore, each anvil front face conforms to an arcuate section of a frusto-conical surface coaxial with bore 63 and central space 80.

The interior of fixture 60 is shaped at its upper end to have a conically-tapered upwardly-flaring opening 85 of greater diameter than the lower portion of bore 63. As shown, the upper sides of the forward portions of the anvils 69 extend radially inward of the conically tapered wall of opening 85, and such upper sides are machined to have flats 86 which all lie in a common horizontal plane. The front end of a vetrical piston 90 bears against these flats either directly or through "Teflon" lubricant sheets 87. As shown the piston is comprised of a forward section 91 and a rearward stem section 92. The head of the forward section is provided by a cylindrical tool 93 which is constituted of a hard and strong material such as cemented tungsten carbide or Stellite, and which is received with a shrink fit in (or is otherwise secured in) a socket 94 formed in the front end of the main body 95 of the forward section. It is the tool head 93 which bears against the flats 86 of the anvils 69. As shown, a rearward part of the main body 95 is slidingly received in a hydraulic cylinder 96 formed in the upper crosshead 41. Cylinder 96 may be filled with pressurized hydraulic fluid through a conduit represented by the dotted line 97.

The stem section 92 of piston 90 extends upwardly from rear section 91 through hydraulic cylinder 96 and then through a smaller diameter aperture 100 in crosshead 41 and beyond that aperture so that a portion of the stem is salient from the upper side of the crosshead. The upper end of that salient stem portion is coupled by a horizontal yoke 101 to two auxiliary hydraulic rams 102 and 103 adapted when actuated to raise the piston 90 upwardly.

The piston 90 is a hollow piston in the sense that it has formed therein an axial bore 104 which extends all the way through the piston from the front or lower end thereof to the rear or upper end thereof.

As shown, a seal assembly 105 is seated on forward section 91 to reduce or eliminate downward leakage of pressurized hydraulic fluid out of chamber 96, and another seal assembly 106 is seated in aperture 100 to reduce or eliminate upward leakage of such fluid out of that chamber. The assembly 105 may be of the type shown by FIGS. 1–4 of U.S. Pat. 3,156,475. Assembly 106 may be a conventional O-ring.

The fixture 60 is coupled to the piston 90 by a lost motion coupling in a manner as follows: A pair of arms 110, 111 are secured to the upper end of that fixture and extend upwardly therefrom along the slight of the main body 95 of forward piston section 91. Projecting outward from that main body are pins 112 slidably secured in vertical slots 113 formed in the arms 110 and 111. Because there is no coupling of the fixture 60 through the arms 110, 111 to piston 90 except by the mentioned pins and slots, piston 90 may move upward without imparting any motion to the fixture until the pins 112 engage the upper end walls 114 of the slots 113. When however, the pins so engage, all slack in the lost motion coupling has been taken up, and further upward movement of the piston will lift the fixture.

OPERATION

At the start of a sleeve securing operaiton, the fixture 60 is in a vertical position the same as or slightly higher than that shown in FIG. 2. When fixture 60 is so positioned, the front faces 71 of anvils 69 are at the sides of axial bore 63 to provide a clear passage upward through central space 80. Piston 90 is held in an upward position by the rams 102 and 103 so that pins 112 engage slot end walls 114 in arms 110, 111 (to thereby hold up the fixture) and so that a clearance space is opened up between the front end of tool head 93 and the flats 86 on the anvils.

While fixture 60 and piston 90 are so positioned, a length of cable 120 is fed up through the bore 63 in fixture 60 until the free end or trip thereof is above the flats 86. An anchor sleeve 125 is then inserted into the press sidewise through the space between crossheads 40 and 41 and into the mentioned clearance space so as to be positioned below the raised tool head 93 and just above and coaxial with the tip of the cable. Next either the sleeve is slipped down over the cable so that the tip passes through the sleeve or, alternatively, the cable is advanced upward a distance to pass through the sleeve. The inner diameter of the sleeve is matched to the outer diameter of the cable so that, when the cable passes through the cable, there is a slight frictional engagement therebetween which prevents the slipping by its own weight of the sleeve along the cable but which, nevertheless, permits forcible slipping of the sleeve along the cable.

At this point it should be noted that bore 63 in fixture 60 has a diameter greater than the our diameter of sleeve 125.

Figure 3:
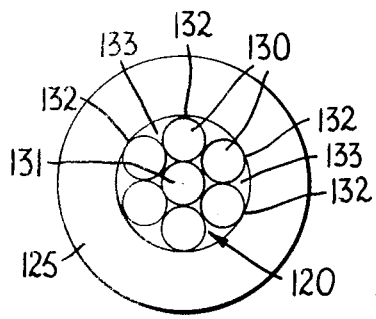
FIGS. 3, 4 and 5 are diagrams explanatory of methods by which, according to the invention, a sleeve is secured to the cable.

Considering further the character of the elements 120 and 125, the cable 120 is (FIG. 3) a multistrand cable comprised, for example, of six outside strands or wires 130 helically twisted around a central strand or wire 131. Instead of the core for the sleeve being a single multistrand cable such as is shown in FIG. 3, the core may have other forms as, for example, being provided by a bundle of nineteen of such single cables.

The outside strands 130 of cable 120 cause the exterior of the cable to be characterized by prominences 132 having void spaces 133 therebetween. The prominences are provided by the strands 130 themselves. In the circumferential direction around the cable's exterior, there is an alternation of prominences 132 and voids 133. Moreover, because the outside cable strands 130 are twisted around central strand 131 rather than running parallel to it, there is also an alternation of prominences and voids in the axial direction of the cable. That is, if a cross section of the cable is taken through the axis thereof, the edges of that cross section will be characterized by an alternation of prominences caused by the intersection of the cross-section plane with one after another of the helically twisted outside strands and by voids corresponding to the interstices between these strands.

The sleeve 125 is constituted of a steel which has a lower elastic limit than that of the cable and which is plastically deformable under high pressure from the anvils 69. As shown by FIG. 2, the axial extent of the interior surface of sleeve 125 is greater than the inner diameter of the sleeve or (which is the same thing) the outer diameter of the cable 120. While, for the particular sleeve which is shown, the axial extent exceeds the inner diameter by a factor of four, the ratio of sleeve axial extent to sleeve inner diameter may be larger than 4.0 e.g. on the order of ten or greater. The desirability of having the sleeve's extent greater than its inner diameter will be later explained in more detail.

Returning now to the sleeve securing operation, after the tip of cable 20 has been passed through sleeve 125, the cable is advanced further into the press to cause the tip to enter the axial bore 104 in the piston. In the course of such advance, the upper end of sleeve 125 is brought into contact with tool head 93 and can advance no further so that, thereafter, the cable is forced upwardly through the sleeve. The cable advance is continued until its tip is fed all the way through bore 104 and to a point above the upper end of piston 92 at which the tip is spaced by a desired length of cable from the upper end of sleeve 125. The cable is then clamped to the piston 90 by conventional means (not shown) so that the piston 90, sleeve 125 and cable 120 will all move together.

The rams 102 and 103 are now decompressed to allow downward driving of the piston 90 by introduction through conduit 97 of pressurized hydraulic fluid into the hydraulic cylinder 96. The piston responds to the pressure of such fluid to move down to the position shown in FIG. 2. During that downward movement the fixture 60 is held in position by the friction between anvil backup plates 67 and the slide surfaces 54 on the interior of container 60.

The piston's movement ultimately causes the front of tool head 93 to bear, as shown, on the flats 86 of the anvils 69. When the tool head 93 so bears, the sleeve 125 is properly positioned in space 80 in relation to the front faces 71 of the anvils 69 to be subjected to pressure by those anvils.

So far the movement of the piston has been substantially pressureless. After, however, the tool 93 bears on the anvils 69, the piston produces a downward forcing under pressure of these anvils. In this connection, note that since pressurized fluid in cylinder 96 acts on the piston over a rearward area much greater in size than the area over which head 93 bears on the anvils, the piston acts as a pressure multiplier so as to exert on the anvils a much greater pressure than the fluid pressure. Note also that, since the cable 120 moves with the piston and the fixture 60 is free to move with the anvils, there is a simultaneous equal downward movement of all of the elements of the piston 90, the cable 120, the sleeve 125, the anvils 69 and the fixture 60. The container 52, however, remains stationary.

As the anvils 69 are so driven downward within and relative to container 60, the anvil back-up plates 67 slide downward in the guideways 56 to bear on the planar slide surfaces 54 which form the bottoms of those guideways. Because each of those surfaces 54 slants inwardly with distance in the downward direction, the downward movement of the back-up plates in the guideways causes the slide surfaces 54 to act through the back-up plates on the anvils so as to wedge those anvils radially inward towards and into contact with the circumferential exterior of the sleeve 125. Moreover, the wedging action of the slide surfaces produces additional compression of the retractor springs 72.

The wedging effect of the slide surfaces produces a pressure multiplying action in addition to that provided by piston 90. Moreover, a further pressure multiplying action is provided by the fact that the anvils 69 have tapered front ends (see FIG. 4). Accordingly, when the front faces 71 of anvils 69 come into contact with the exterior of sleeve 125, those anvils circumferentially pressurize that sleeve over its whole axial length with a radially inward directed pressure which is great enough to stress the whole body of the sleeve metal beyond its elastic limit. That is, from the sleeve's exterior to its interior, the metal thereof is rendered in a plastically deformable or quasi-hydrostatic pressure transmissive state, and the metal is plastically deformed throughout the radial dimension of the sleeve by the radially inward directed pressure by which the sleeve's exterior is circumferentially pressurized.

FIG. 4 shows the sleeve being plastically deformed by the pressure exerted by the radially inwardly moving anvils 69a–69d. Since the sleeve metal is plastically deformed throughout so as to be squeezed in its plastically deformable state against the cable 120, some of the sleeve metal is forced into the voids 133 between the outside strands 130 of the cable so as to form protrusion 140 extending radially inwards from the sleeve and occupying a large part or all of those void spaces. In the course of forming such protrusions, the plastically deformed sleeve metal flows around the exteriors of the cable strands 130 while in contacting relation therewith so as to make area contact with the cable's exterior over a substantial fraction of the entire area of the cable's exterior which is contained within the sleeve. As shown, some of the metal on the outside of the sleeve is squeezed into the radial gaps 141 between the anvils to there form small fins or flashings 142.

While the sleeve metal is so plastically deformed, preferably the pressure transmitted through the sleeve metal to the cable 120 is low enough so that, considering the high elastic strain limit of the cable material, the strands of the cable are only resiliently deformed by that pressure. The resilient deformation of the cable strands is indicated in FIG. 4 by the showing of the cross sections of the strands having the same circular form as they have in FIG. 3. If the cable strands were to be plastically deformed by the pressure applied thereto, their cross sections would assume a quasi-hexagonal shape which permits more compact packing of the strands than does the circular cross section.

When the sleeve 125 has been plastically deformed to the desired degree, the hydraulic cylinder 96 is decompressed to release the radially inward directed pressure on the sleeve. Next, the cable 120 is unclamped from the piston 90, and the rams 102 and 103 are actuated to drive the piston upwardly. As the piston moves up, the fixture 60 initially remains at the position to which it has been downwardly forced with the anvils remaining in contact with the sleeve. When, however, the upward motion of the piston takes up all the slack in the lost motion coupling provided by the arms 110, 111 and the pins 112 sliding in the slots 113 in those arms, the fixture 60 is lifted by the piston to move upward therewith. Thereupon, the compression springs 72 force the anvil back-up plates 60 radially outward so as to cause the anvils 69 to retract from the sleeve and to assume their shown positions (FIG. 2) at the side of bore 63 in the fixture. The length of cable with the sleeves 125 secured thereto is then removed from the press by pulling the cable downward and out from the bottom of the stem 62 of the fixture.

Figure 5:
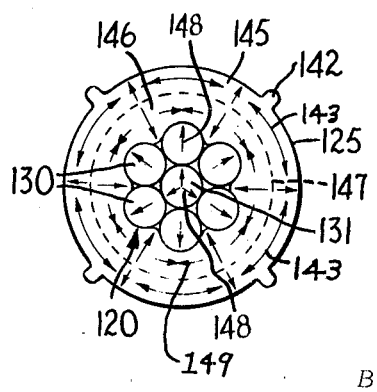

To consider the stress conditions existing in the sleeve and cable after the pressure on the sleeve has been released, it will be recalled that such pressure plastically deformed the sleeve metal but only resiliently deformed the cable metal. Referring to FIG. 5, the plastic deforming by pressure of the sleeve metal and the subsequent release of that pressure serves under coldworking conditions to provide what is termed herein a controactive autofrettage effect. The effect is so designated because it is similar in some ways to the convention and well-known expansive autofrettage effect but is produced in an opposite manner. As later explained in more detail, the contractive autofrettage develops in the sleeve at the end of the securing operation (i.e., when the pressure is released) a stress condition wherein the radially outward part of the sleeve is in hoop tension and the radially inward part of the sleeve is in hook compression. That stress condition is qualitatively represented in FIG. 5 wherein the sleeve is shown as divided into radially outward and inward parts 145 and 146 by a dotted line circle 147 having a diameter the same as or close to the mean diameter of the secured sleeve, and wherein the arrows 143 in the outward part are representative of hoop tension stress and the arrows 149 in the inward part 146 are representative of hoop compressive stress.

Because the cable was resiliently contacted by the applied pressure and because the sleeve was plastically deformed by such pressure to undergo a permanent contraction in size, and aftereffect of the release of the pressure is that the cable "pushes" on the interior of the sleeve with resilient radially outward directed forces represented in FIG. 5 by the arrows 148. Accordingly, the sleeve grips the cable tightly to provide great resistance to breaking away of the sleeve from its secured position on the cable. Other factors which increase that resistance are as follows: First, because, as described, some of the sleeve metal has been forced by the applied pressure to flow in around the exteriors of the outside cable strans 130 and into the voids 133 therebetween, the sleeve metal is in areal contact with the cable over a large part of its irregular circumferential extent, whereby the friction grip of the sleeve on the cable is correspondingly increased. Second, because, the cable's exterior is, as described, characterized by an alternation of prominances and voids in the axial direction as well as in the circumferential direction, the protrusions of sleeve metal into the voids create between the sleeve and cable a positive interlock rather than merely a frictional grip. Third, the resistance to displacement of the sleeve along the cable is roughly proportional to the axial extent over which there is engagement between sleeve and cable, wherefore, because the secured sleeve has an axial extent substantially greater than its diameter, the mentioned resistance is greatly increased as compared to that which would be provided by a sleeve of which the axial extent is equal to or less than the inner diameter thereof. Indeed, one of the important advantages of the present invention is that because the sleeve is pressurized by radially inward directed pressure as opposed to, say, axial pressure, the sleeve (and the anvils acting thereon) may be increased as desired in axial length without detracting from the ability to produce a good engagement between sleeve and cable over all or most of the sleeve's length.

To describe a practical example of the practice of the method, cable 20 is seven strand cable of ½″ diameter, and the undeformed sleeve has an outer diameter of 1″ and a length of 4″. The FIG. 2 press is designed to exert by the anvils on the sleeve a pressure on the order of 300,000 p.s.i. The sleeve material is 5160 high carbon steel. The strands of the cable are formed of high carbon steel which is wire drawn to have a tensile strength on the order of 200,000 p.s.i. The steel of the cable is substantially harder than that of the sleeve.

Returning now to the contractive autofrettage effect which accompanies the securing of the sleeve to the cable, a better understanding of that phenomenon will be gained from the following simplified and qualitative explanation of how the effect is realized. Assume that a hypothetical metal sleeve 150 (FIG. 6) surrounds a hypothetical incompressible core 151 so that the core is contacted all around by the sleeve. Sleeve 150 has an inner radius $r_i$, an outer radius $r_o$ and a mean radius $r_m$ which is the radius of the shown dotted line circle 152. The distances $r_o - r_m$ and $r_m - r_i$ are $t_o$ and $t_i$, respectively.

Figure 6:
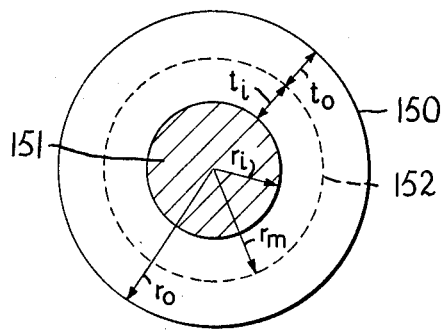
Figure 7:
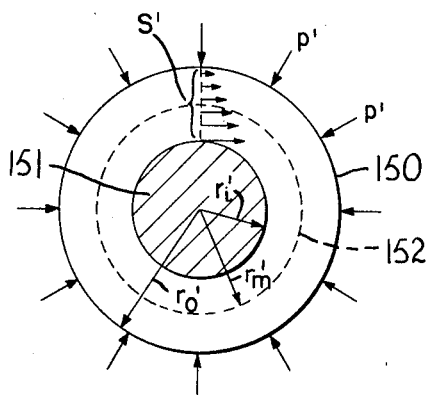
FIGS. 7–10 are diagrams explanatory of a contractive autofrettage effect involved in said methods.

Assume now that sleeve 150 is subjected (FIG. 7) to radially inward pressure $p'$ which only resiliently deforms the sleeve metal. Because core 151 is incompressible, the inner radius $r_i'$ in FIG. 7 is the same as $r_i$ (FIG. 6). The outer radius contracts, however, so that $r_o'$ is less than $r_o$. Further, because of the contraction of the outer radius, the mean radius also contracts so that $r_m'$ is less than $r_m$. When the sleeve is resiliently deformed as in FIG. 7, the sleeve metal is under compressive stress which varies with radial distance as indicated by the arrows $S'$. Note that the release of pressure at the FIG. 7 stage will cause the sleeve 150 to spring back to its original dimensions.

Now suppose (FIG. 8) that the radially inward pressure is increased to a value $P''$ which plastically deforms the sleeve metal, and suppose, also, that, under that pressure, the sleeve metal is a fully hydrostatic pressure transmission medium. Under that condition, the sleeve metal is able to flow freely to produce uniform compressive stress throughout the volume of the sleeve, such uniform stress being indicated by the arrows $S''$. That is, the non-uniform distribution of compressive stress shown in FIG. 7 will be changed in FIG. 8 to a uniform distribution. Because, however, the bulk reduction in unit volume varies directly with the stress on each incremental volume considered and because in FIG. 8 each incremental volume of sleeve metal is under the same maximum compressive stress (rather than some incremental volumes being under lower stress and some under higher stress as in FIG. 7), during the FIG. 8 stage the sleeve metal, in effect, redistributes itself to provide a volume for the sleeve which is more compact than if the sleeve were to only resiliently deform under the same pressure. The specific way in which that more compact volume is achieved is that the sleeve 150 contacts further around the core 151 so that the mean radius circle 152 moves in further than if the sleeve were to undergo only a resilient deformation in response to the same radially inward pressure.

Figure 8:
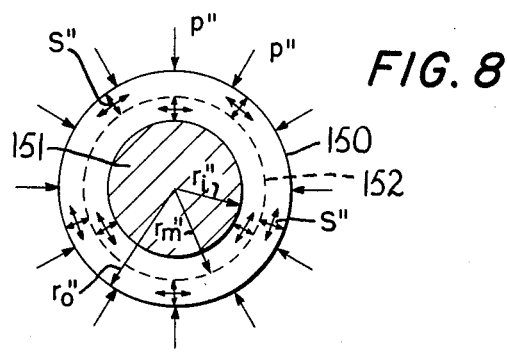

Assume next that, while the sleeve is in its compacted state characterizing the FIG. 8 stage, a resiliently deformable core 160 is somehow substituted (FIG. 9) for the incompressible core 150, and the radically inward pressure on the sleeve is released. Upon an initial lowering of the pressure from $p''$ to $p'$, the sleeve metal will change back to the elastic state and the incremental volumes of the sleeve metal will be "frozen" in position. Those volumes can, however elastically expand with further pressure lowering. Thus, as in the course of the release, the pressure reduces from $p'$ to zero, the sleeve metal will tend to elastically expand both radially outward and radially inward from the mean radius circle 152. Because, however, that circle now has a smaller radius $r_m'''$ than if the sleeve had only resiliently deformed during the FIG. 8 stage, and because, moreover, the metal in the radially inward part of the sleeve forms a support "arch" for itself, the inwardly expanding metal finds itself "crowded" and, therefore, generates a compressive hoop stress in the radially inward parts of the sleeve. Further, because the mean radius circle 152 has moved in as described, such inward expansion as there is of the sleeve metal from that circle produces a contraction of the sleeve's inner radius from its previously constant value $r_1$ (or $r_1'$ or $r_1''$) to a smaller value $r_1'''$. When, however, the sleeve's inner radius thus contracts around the now resiliently deformable core 160, that core is elastically compressed by the contraction and, therefore, exerts a radially outward reaction force on the sleeve.

Figure 10:
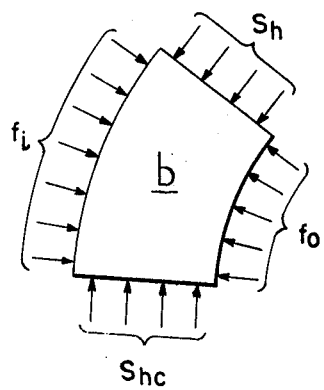
Figure 9:
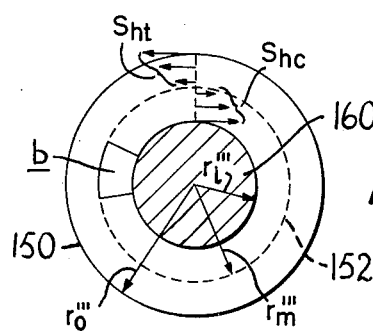

Consider now the forces on the incremental volume $b$ of sleeve metal which is shown in FIG. 9 and in enlarged form in FIG. 10. Volume $b$ is a sector of the radially inward part of the sleeve and is thus subjected to compressive hoop stress $S_{hc}$ which has a radially outward component. Further, volume $b$ is subjected to radially outward distributed forces $f_o$ from the elastically compressed core 160. At the same time, however, we know that volume $b$ is in static equilibrium. Hence, we know that the radially outward directed component of the hoop stress $S_h$ on the volume and the radially outward directed forces $f_o$ thereon must be equal and opposed to radially inward directed forces $f_i$ exerted on $b$ from the radially outward part of the sleeve. Evidently, however, the effect of the exertion of the forces $f_i$ on $b$ by the outward part of the sleeve is to generate hoop tensile stresses $S_{ht}$ (FIG. 9) in that outward part. Accordingly, the sleeve in the FIG. 9 stage is internally stressed so as to have the stress distribution pattern shown in that figure (and in FIG. 5) i.e., a pattern such that a radially outward part of the sleeve is in hoop tension and a radially inward part of the sleeve is in hoop compression. The effect is one of autofrettage because the sleeve self-maintains that internally stressed condition but (as opposed to ordinary autofrettage) it is contractive autofrettage because the effect is produced by contraction of the sleeve under externally applied pressure rather than by expansion of the sleeve under internally applied pressure.

It should be noted that the contractive autofrettage effect is caused because the sleeve metal changes rapidly from its plastic state to its elastic state when the pressure on the sleeve is released. That rapid change is caused in turn by the fact that the sleeve is being coldworked. If the sleeve were in a heated condition so as to remain plastic upon release of the pressure, then the sleeve metal could flow to relieve stresses building up in the sleeve, and the contractive autofrettage effect would not occur.

The practice of the previously described sleeve securing method differs inter alia from the simplified explanation just given in that, in the method as actually carried out, the core is never wholly incompressible as is core 150 and, while the sleeve metal is plastically deformed by the pressure therein, such deformed metal is in a state which is more accurately described as quasi-hydrostatic pressure transmissive than hydrostatic pressure transmissive.

MODIFICATIONS

In the FIG. 2 press, the front faces of the anvils 61 are at an angle to the circular cylindrical exterior of sleeve 125. FIG. 11 shows a modification wherein the anvils have front faces 71' which are arcuate sections of a circular cylindrical surface coaxial with the cylindrical surface of the sleeve's exterior.

In the FIG. 12 modification, the slyeeve has a conically tapered exterior surface 170 contacted by the conically tapered front faces 71 of the anvils 69'. The piston head 93 contacts only the sleeve 125 (i.e., does not contact flats 86 on the anvils as in FIGS. 2 and 11), and the anvils are moved downward by their frictional engagement with sleeve 125 when that sleeve is moved down by the driving action of the piston head. In order to induce such downward movement of the anvils, their axes 172 must be at a slight angle (e.g., 1°) to lines 173 which are perpendicular to the sliced surfaces 54 so as to provide an anvil displacement component 174 in the forces by which the anvils react on these slide surfaces. In like manner, if the anvils of FIG. 2 are in frictional contact with sleeve 125 before the driving of the piston begins and if, also, the axes of the anvils are at an angle (as in FIG. 12) to the slide surfaces 54, the piston may drive the sleeve-anvil assembly by bearing only on the sleeve whose downward movement is communicated to the anvils through the frictional contact therebetween.

Further, in any instance where the anvils before the beginning of piston driving are in frictional contact with the sleeve 125, the sleeve-anvil assembly may be driven downward by having the piston head 93 bear upon the anvils but not upon the sleeve.

FIG. 13 shows a press which may be used instead of the FIG. 1 press to secure sleeve 125 to cable 120. In the FIG. 13 press, the frame is in the shape of a square comprised of four arrays 180–183 of tie bars which are interleaved with each other at each corner of the square. The interleaving at each other also includes a side-to-side array 185 of ram back-up plates extending diagonally from that corner towards the center of the square. A hinge joint is formed at each corner by a pin 186 passing through registering holes in the interleaved tie bars and back-up plates.

Mounted on the front ends of the four back-up plates array are four hydraulic jacks 190 of which each drives a respective one of four pressure multiplying anvils 191 which may be similar to the anvils 69 of FIG. 2. As in FIG. 2, the forward portions of the four anvils are separated by radially extending gaps permitting simultaneous radially inward movement of all anvils, and the anvils form a ring around a central pressurizing space open at both of its axially opposite ends and enclosed by the front faces of said anvils except at the mentioned gaps. The sleeve 125 is positioned in that space and the cable 120 is led axially (i.e., normal to the plane of the FIG. 13 drawing) through that space to pass through the interior of the sleeve. When the four jacks 190 are actuated, the four anvils 191 circumferentially pressurize sleeve 125 by radially inward directed pressure to plastically deform the sleeve metal and to produce a secure engagement between the sleeve and cable 120 in the manner described in connection with FIG. 2.

While the FIG. 13 press is similar in some respects to those disclosed in U.S. Pat. 2,968,837 and French Pat. 1,401,193 a distinguishing feature of the press of FIG. 13 is that the lines of actions of its rams pass through the vertices of the load bearing frame for the rams rather than through the sides of that frame.

The above-described embodiments being exemplary only, it is to be understood that additions thereto, modifications thereof and omissions therefrom may be made without departing from the spirit of the invention, and that the invention comprehends embodiments differing in form and/or detail from these specifically disclosed. For example, in order to limit axial flowing of the sleeve metal when the sleeve is plastically deformed by the radially inward pressure of the anvils, those anvils may be equipped with side plates which together cover most of the axial end faces of the sleeve so as to provide barriers to the axial flow of the sleeve metal.

Accordingly, the invention is not to be considered as limited save as consonant with the recitals of the following claims.

We claim:

1. Apparatus for securing a metal sleeve on an axially elongated metal core means comprising, a plurality of pressure-exerting anvils disposed circumferentially of a central space to be angularly spaced from each other by gaps permitting radial inward movement of said anvils, said space being axially open at both ends and being circumferentially enclosed by the front face of said anvils, except at said gaps, means permitting insertion of said sleeve and core means in said space with said sleeve being in axial registration with said anvils and said core means passing axially from the outside of one axial end of said space through said sleeve and to the outside of the other axial end of said space, and means to produce a simultaneous radially inward driving of said anvials against the circumferential exterior of said sleeve so as to plastically deform the sleeve metal to produce a gripping of said core means by said sleeve, a plurality of side to side arrays of parallel transversely spaced tie bars, the tie bars of each array being interleaved at each end of that array with the tie bars of another one of said arrays so that said arrays form a closed polygonal configuration, a plurality of hinge pins each disposed at a respective one of the vertices of said configuration to pass transversely through the interleaved tie bars at that vertex so as to form a hinge joint of the tie bar arrays interleaved at that vertex, said pins connecting said plurality of tie bar arrays into a closed polygonal frame, and a plurality of pressure-exerting hydraulic jack means each backed by said frame and adapted to exert simultaneous pressure from different directions on a central object within said frame, each of said hydraulic jack means being disposed within said frame to have a center line of action passing through a respective one of said vertices of said frame, the rams of each of said hydraulic jack means being coupled at its front end to a respective one of said anvils so as to collectively provide means to produce a simultaneous radially inward driving of said anvils.

2. Apparatus for securing a sleeve on axially elongated metal core means comprising, tubular container means having inner slide surfaces disposed around an axis for said container means to convergently taper towards a first of axially opposite open ends of the interior of said container means, a plurality of anvil means disposed in said container means in a ring around said axis to each be backed by a respective one of said surfaces and to extend circumferentially around a central space which is open at each of axially opposite first and second ends corresponding to, respectively, said first and the second end of said container means, axially movable piston means disposed at said second end of said space and having therein an axial bore, means permitting insertion of said sleeve and core means into said space with said sleeve being in axial registration with said anvil means and said core means passing axially from the outside of said first end of said container means, axially movable piston means and space and into said bore of said piston means, and means adapted by axially driving said piston means towards said first end of said container means to produce a sliding in that direction of said anvil means on said surfaces and an accompanying wedging by said surfaces of said anvil means against said sleeve so as to plastically deform the sleeve metal to produce a gripping of said core means by said sleeve.

3. Apparatus as in claim 2 in which the front end of said piston means bears against each of said anvil means to produce said sliding of those anvil means.

4. Apparatus as in claim 3 in which the front end of said piston means also bears against the end of said sleeve towards said piston means so as to axially drive said sleeve ahead of said piston means.

5. Apparatus as in claim 2 in which the exterior of said sleeve is in the shape of a circular cylindrical surface.

6. Apparatus as in claim 5 in which each of said anvil means has towards said sleeve a front face in the shape of an arc of a conically tapered surface coaxial with said sleeve surface.

7. Apparatus as in claim 5 in which each of said anvil means has towards said sleeve a front face in the shape of an arc of a cylindrical surface coaxial with said sleeve surface.

8. Apparatus as in claim 2 in which each of said anvil means passes through a corresponding aperture formed in a tubular guide fixture disposed in said container means around said space and axially movable within said container means in accompaniment with the axial movement characterizing said anvil means in the course of the slidings of the latter on said slide surfaces, said apparatus further comprising means to impart to said piston means a reverse axial motion in the direction away from said first end of said container, and means providing between said piston means and fixture a lost motion coupling whereby the reverse motion of said piston means is imparted to said fixture when the slack in said coupling has been taken up.

9. Apparatus as in claim 8 further comprising spring retractor means carried by said fixture for each anvil means, each retractor means being responsive to the reverse motion of said fixture to retract the corresponding anvil means away from said sleeve.

10. Apparatus as in claim 2 in which said piston means is comprised of a ram section having a forward end salient from a hydraulic cylinder and a back end slidably received in said cylinder, and in which said piston means further comprises a stem section of smaller diameter than said ram section and extending rearwardly from the back end of said ram section through an aperture in the back end of said cylinder and beyond such back end to the outside of said cylinder, the axial bore of said piston means extending both through said ram section and through said stem section to provide a passage through said piston means for said core means.

11. Hydraulic apparatus comprising, a hydraulic cylinder, a piston comprised of a forward ram section and a coaxial rearward stem section of smaller diameter than said ram section, said ram section having a front end salient from said cylinder and a back end slidably received in said cylinder, said stem section extending rearwardly from said ram section through an aperture formed in the back end of said cylinder and beyond such back end to the outside of said cylinder, said piston having therein an axial bore extending through said ram section and stem section to provide an open axial passage all the way through said piston, and seal means disposed around said stem section to seal the passage of said stem section through said aperture against leakage of hydraulic fluid from the interior or said cylinder to the outside thereof.

12. A press comprising, a plurality of side to side arrays of parallel transversely spaced tie bars, the tie bars of each array being interleaved at each end of that array with the tie bars of another one of said arrays so that said arrays form a closed polygonal configuration, a plurality of hinge pins each disposed at a respective one of the vertices of said configuration to pass transversely through the interleaved tie bars at that vertex so as to form a hinge joint of the tie bar arrays interleaved at that vertex, said pins connecting said plurality of tie bar arrays into a closed polygonal frame, and a plurality of pressure-exerting hydraulic jack means each backed by said frame and adapted to exert simultaneous pressures from different directions on a central object within said frame, each of said hydraulic jack means being disposed said frame to have a center line of action passing through a respective one of said vertices of said frame.

13. Apparatus for applying radial inward pressure on a central object comprising, tubular container means having inner slide surfaces disposed around an axis for said means to convergently taper towards a first of axially opposite open ends of the interior of said container means, a plurality of anvil means disposed in said container means in a ring around said axis to each be backed by a respective one of said surfaces and to extend circumferentially of a central space for containing said object, piston means to axially drive said anvil means towards said first end of said container means to produce a sliding in that direction of said anvil means on said surfaces and an accompanying wedging by said surfaces of said anvil means against said object, a tubular guide fixture disposed in said container means around said space, said fixture having therein a plurality of apertures of which each provides a passage from the radially outer side to the radially inner side of said fixture and through each of which there passes a respective one of said anvil means, means to impart to said piston means a reverse axial motion in the direction away from said first end of said container, and means providing between said piston means and fixture a lost motion coupling whereby the reverse motion of said piston means is imparted to said fixture when the slack in said coupling has been taken up.

References Cited

UNITED STATES PATENTS 2,999,405  9/1961  Ewart _____ 72—402

CHARLES W. LANHAM, Primary Examiner

G. P. CROSBY, Assistant Examiner

U.S. Cl. X.R.

29—191.6, 517; 72—452